(12) United States Patent
Nishida et al.

(10) Patent No.: US 6,657,813 B2
(45) Date of Patent: Dec. 2, 2003

(54) PERPENDICULAR MAGNETIC RECORDING SYSTEM

(75) Inventors: Yasutaka Nishida, Kodaira (JP); Hisashi Takano, Kodaira (JP); Masafumi Mochizuki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 171 days.

(21) Appl. No.: 09/785,417

(22) Filed: Feb. 20, 2001

(65) Prior Publication Data

US 2001/0017746 A1 Aug. 30, 2001

(30) Foreign Application Priority Data

Feb. 28, 2000 (JP) .......................... 2000-051917

(51) Int. Cl.$^7$ .......................... G11B 5/127; G11B 5/187
(52) U.S. Cl. ........................................ 360/125
(58) Field of Search .............................. 360/125, 126, 360/131; 428/216, 332

(56) References Cited

U.S. PATENT DOCUMENTS

| | | | |
|---|---|---|---|
| 4,895,758 A | * 1/1990 | Sakemoto et al. | 360/125 |
| 5,486,967 A | * 1/1996 | Tanaka et al. | 360/318 |
| 5,543,221 A | * 8/1996 | Kitakami et al. | 428/332 |
| 5,854,727 A | * 12/1998 | Tanaka et al. | 360/125 |
| 5,995,341 A | * 11/1999 | Tanaka et al. | 360/125 |
| 6,194,058 B1 | * 2/2001 | Isobe et al. | 428/216 |

FOREIGN PATENT DOCUMENTS

| | | | | |
|---|---|---|---|---|
| JP | 61-026927 | * | 2/1986 | .......... G11B/5/066 |
| JP | 7-235002 | | 9/1995 | |
| JP | 10-003643 | * | 6/1998 | .......... G11B/5/070 |
| JP | 10-283624 | | 10/1998 | .......... G11B/5/66 |
| JP | 11-066503 | | 3/1999 | |

OTHER PUBLICATIONS

Machine Translation of JP 10–003643; 22 pgs.*
Abstract of JP 61–026927.*

* cited by examiner

Primary Examiner—George J. Letscher
Assistant Examiner—C R Beacham
(74) Attorney, Agent, or Firm—Kenyon & Kenyon

(57) ABSTRACT

To make a soft magnetic underlayer of a double layered perpendicular magnetic recording medium thinner than heretofore while avoiding saturation. Assuming that $T_{b1}$ is the thickness of the soft magnetic underlayer of the double layered perpendicular magnetic recording medium, $B_{S2}$ the saturation flux density of the same, $T_m$ the thickness of a magnetic recording head's main pole 1 along a track direction in the vicinity of its floating surface, $T_{WW}$ the track width of the same, and $B_{S1}$ the saturation flux density of the same, then $T_{b1} < (B_{S1} \times T_m \times T_{WW})/(2(B_{S2} \times (T_m + T_{WW})))$ is satisfied.

6 Claims, 6 Drawing Sheets

PERPENDICULAR MAGNETIC RECORDING SYSTEM

BACKGROUND OF THE INVENTION

1. Field of the Invention

The present invention relates to a perpendicular magnetic recording system using a perpendicular magnetic recording medium (double layered perpendicular magnetic recording medium) having a soft magnetic underlayer.

2. Description of the Related Prior Art

In perpendicular magnetic recording systems using a double layered perpendicular magnetic recording medium, magnetic flux extending from a main pole of a recording head follows a magnetic path that runs through a soft magnetic underlayer of the double layered perpendicular recording medium to enter an auxiliary pole of a magnetic head and then returns to the main pole. Conventional perpendicular magnetic recording media have adopted soft magnetic underlayers of greater design thicknesses so as to avoid magnetic saturation of the soft magnetic underlayers.

FIG. 4 is a diagram explaining the cross section of a path through which magnetic flux flows on a conventional model. As shown in FIG. 4, in order to prevent a soft magnetic underlayer 6 of a perpendicular magnetic recording medium from being saturated by the magnetic flux from a main pole 1 of a magnetic head, it is considered that the limit of the prevention is determined by both the area of the cross section 11 of the magnetic flux inside the soft magnetic underlayer, through which the magnetic flux extending from a top face 10 of the main pole passes, and the saturation flux density of the soft magnetic underlayer 6, and it is necessary to satisfy the following relational expression:

$$T_{WW} \times T_{b1} \times B_{S2} > T_{WW} \times T_m \times B_{S1},$$

i.e., $$T_{b1} \times B_{S2} > T_m \times B_{S1}, \quad (1)$$

wherein $T_{WW}$ is the track width of the main pole 1, $B_{S1}$ the saturation flux density of the main pole 1, $T_m$ the thickness of the main pole 1, $B_{S2}$ the saturation flux density of the soft magnetic underlayer 6, and $T_{b1}$ the thickness of the soft magnetic underlayer. In view of this, perpendicular magnetic recording media have been provided with a thick soft magnetic underlayer.

For example, Japanese Patent Laid-Open Publication No. Hei 10-283624 describes a double layered perpendicular magnetic recording medium having a soft magnetic underlayer of 600 nm in thickness.

In conventional ideas, for example, the saturation flux density $B_S$ of a main pole of 1.6 T, the thickness $T_m$ of the same of 0.5 $\mu$m, and the saturation flux density $B_S$ of a soft magnetic underlayer of 1.2 T combine to require, according to the expression (1), the thickness $T_{b1}$ of the soft magnetic underlayer as great as 0.67 $\mu$m or more. This is no less than ten times the thickness of the magnetic recording layers of current in-plane magnetic recording media which is no greater than several tens of nanometers. Given here that the growth rates are nearly equal, the growth time becomes more than ten times, causing a drop in production efficiency and a rise in cost. Moreover, the consumption of the target used in the sputtering also increases for a cost increase. Besides, greater thicknesses deteriorate surface roughness because of inhomogeneous grain growth. This causes a problem since high-density magnetic recording media require low surface roughness for the sake of reducing head-medium spacing. Accordingly, conventional double layered perpendicular magnetic recording media were disadvantageous as compared with in-plane magnetic recording media and single layered perpendicular magnetic recording media.

To avoid the saturation of a soft magnetic underlayer without thickening the soft magnetic underlayer, it is necessary to thin the main pole of the magnetic head or raise the saturation magnetization (Bs) of the soft magnetic underlayer significantly. Nevertheless, when the recording layer of the medium has a relatively high coercivity (Hc), the intensity of write magnetic field must be increased, and the thinning of the main pole produces a problem of main pole saturation.

Furthermore, there are other problems including that no material has been found which can increase the saturation magnetization of soft magnetic underlayers considerably.

SUMMARY OF THE INVENTION

In view of such problems in the conventional art, it is an object of the present invention to provide a perpendicular magnetic recording system in which a soft magnetic underlayer of a double layered perpendicular magnetic recording medium is prevented from saturation while the soft magnetic underlayer is designed in a thickness smaller than heretofore.

The present inventor has found that the track width of a recording head and the effect of the track ends can be incorporated into the design of thickness of a soft magnetic underlayer to reduce the soft magnetic underlayer in thickness when the track width is small. With reference to FIGS. 1 and 2, description will be given of the relational expressions which the present inventors have found in connection with the thicknesses of soft magnetic underlayers of double layered perpendicular magnetic recording media.

FIG. 1 is a schematic diagram of the top of a recording head as seen from the floating surface, or a diagram explaining the magnetic flux inside a soft magnetic underlayer. Magnetic flux 3 extending from a main pole of a magnetic head for recording magnetization transitions on a magnetic recording medium passes through a soft magnetic underlayer of the magnetic recording medium to return to an auxiliary pole 2 of the magnetic head. The paths through which the magnetic flux 3 flows can be classified into paths A–C. The path A runs at the track center, nearly straight across the opposed faces of the main pole 1 and the auxiliary pole 2. The paths B return from the sides of the main pole 1 to the auxiliary pole 2. The paths C return to the auxiliary pole 2 around behind the ends of the main pole 1. Then, the main pole 1 can be divided into a region I at the track center, provided with the path A alone, and regions II on both sides, each provided with the three paths A, B, and C.

FIG. 2 is a schematic diagram showing the top of the main pole 1 of the magnetic head and a soft magnetic underlayer 6 of a double layered perpendicular magnetic recording medium, or a diagram explaining the cross sections of paths through which magnetic flux flows. Assume here that the width of each region II of the main pole 1 is $W_S$. Besides, let $T_m$ stand for the thickness of the main pole 1, $T_{WW}$ the track width of the main pole 1, $B_{S1}$ the saturation flux density of the main pole 1, $T_{b1}$ the thickness of the soft magnetic underlayer 6, and $B_{S2}$ the saturation flux density of the soft magnetic underlayer 6. The limit to which the soft magnetic underlayer 6 is not saturated by the magnetic flux extending from the region I of the main pole 1 is reached when the product of the top area of the region I of the main pole 1 and the saturation flux density $B_{S1}$ equals to the product of the parallel-to-surface area of the soft magnetic underlayer 6 to make the path A and the saturation flux density $B_{S2}$. In other words, at the time when the following expression holds:

$$B_{S2} \times T_{b1} \times (T_{WW} - 2W_S) = B_{S1} \times T_m \times (T_{WW} - 2W_S).$$

The foregoing expression is arranged into the following expression (1'):

$$B_{S2} \times T_{b1} = B_{S1} \times T_m \quad (1')$$

Like the region I, the regions II need to satisfy the relations between the products of area and saturation flux density for all the three paths A, B, and C mentioned above. More specifically, the following expression needs to be satisfied:

$$B_{S2} \times (T_{b1} \times W_S + T_{b1} \times W_S \times T_{b1} \times T_m) = B_{S1} \times T_m \times W_S$$

Hence $$B_{S2} \times T_{b1} \times (2W_S + T_m) = B_{S1} \times T_m \times W_s \quad (2)$$

The expression (2) makes a sufficient condition when the distance between the main pale 1 and the auxiliary pole 2 is nearly equal to or greater than the thickness $T_m$ of the main pole 1, and the track width is nearly equal to or smaller than the same. In this case, the maximum limit of $T_{WW}$ is twice $W_S$, or $$T_{WW} = 2W_S \quad (3)$$

The expressions (2) and (3) lead to the following expression (4):

$$T_{b1} = (B_{S1} \times T_m \times T_{WW}) / (2(B_{S2} \times (T_m + T_{WW}))) \quad (4)$$

The expression (b 4) is based on the assumption that the magnetic flux from the main pole 1 enters the soft magnetic underlayer 6 and returns to the auxiliary pole 2 without any loss. In reality, the expression (4) is a sufficient condition, not a necessary condition. Thickening the soft magnetic underlayer 6 more than necessary entails a number of problems as described above. Thus, the thickness $T_{b1}$ of the soft magnetic underlayer 6 turns out to be sufficient if it satisfies the following expression (5):

$$T_{b1} < (B_{S1} \times T_m \times T_{WW}) / (2(B_{S2} \times (T_m + T_{WW}))) \quad (5)$$

The calculations obtained for the sake of confirming the foregoing relation as to the thickness $T_{b1}$ of the soft magnetic underlayer 6 are shown in FIG. 3. FIG. 3 is a graph showing the maximum intensities of write magnetic field obtained under the main pole of a magnetic head (the maximum values were obtained since the magnetic field under a main pole is not completely uniform, having some distribution) while changing as the thickness $T_{b1}$ of the soft magnetic underlayer of a magnetic recording medium, with the track width $T_{WW}$ of the main pole of 0.4 μm. Here, the ordinate is normalized with the maximum intensity of write magnetic field with the thickness of the soft magnetic underlayer of 0.5 μm. The curve indicates the normalized write field intensity which drops from "1" as the soft magnetic underlayer decreases in thickness. This is ascribable to the degradation of the soft magnetic underlayer because of saturation.

The chart shows with arrows a thickness of the soft magnetic underlayer for K=1.0 and a thickness of the soft magnetic underlayer for K=0.25, given by the following expression:

$$T_{b1} = K \times (B_{S1} \times T_m \times T_{WW}) / (2(B_{S2} \times (T_m + T_{WW})))$$

It is seen that the normalized write field intensity becomes approximately "1" at K=1.0, whereas the normalized write field intensity sharply decreases in the vicinity of K=0.25. Fabrication of magnetic recording media inevitably involves a certain range of thickness variations, and if the center value were settled in the region of drastic changes in field intensity, the field intensity itself would unfavorably make great changes due to the variations. Thus, in favor of mild variations of the write field intensity with respect to a change in the thickness of the soft magnetic underlayer and in terms of field intensity securability, the lower limit can be set to K=0.25. This shows that the thickness of a soft magnetic underlayer needs to satisfy the following expression (6), as well as the expression (5), to reduce the dependency of the intensity of write magnetic field on soft magnetic underlayers:

$$T_{b1} < K \times (B_{S1} \times T_m \times T_{WW}) / (2(B_{S2} \times (T_m + T_{WW}))) \quad (6)$$

Where K=0.25. It is seen from FIG. 3 that the thickness Tb1 of a soft magnetic underlayer, under the above-described conditions, adequately ranges from 0.05 to 0.2 μm. The thickness of a soft magnetic underlayer of 0.2 μm or less is significantly small as compared with the thickness of the soft magnetic underlayers of conventional double layered perpendicular magnetic recording media.

The expressions (5) and (6) are derived on the condition that the track width be sufficiently smaller than the distance between the main pole 1 and the auxiliary pole 2, or that the expression (3) hold. Besides, too small a distance between the main pole and another pole is inappropriate for perpendicular recording. Moreover, when the distance between the main pole and the auxiliary pole is small, the paths along which the magnetic flux extending from the main pole will not reach the soft magnetic underlayer but return to the auxiliary pole might become minor in reluctance, in which case the perpendicular component of the write magnetic field becomes weak. Accordingly, the distance between the main pole and the auxiliary pole needs to be sufficiently greater than the distance between the head top and the soft magnetic underlayer.

The numerical conditions for satisfying the expression (3) are difficult to present in general form since they involve the ratios of the main and auxiliary poles to the overall size. Nevertheless, as far as realistic conditions are concerned, the satisfaction of the expression (3) requires a distance of 0.5 μm or greater between the main and auxiliary poles, considering that the track width $T_{WW}$ needs to be 0.5 μm or smaller to achieve a high recording density equivalent to or higher than existing ones, and that the main pole actually has a thick $T_m$ of the order of 0.5 μm. That is, the effect of the track ends of the main pole typically comes into play to satisfy the expression (3) when the track width $T_{WW}$ is smaller than or equal to 0.5 μm and the distance between the main and auxiliary poles is greater than or equal to 0.5 μm. Here, the soft magnetic underlayer of the perpendicular magnetic recording medium may be set to, for example, 0.2 μm or smaller in thickness $T_{b1}$.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENT

Hereinafter, description will be given of an embodiment of the present invention.

Figure 1:
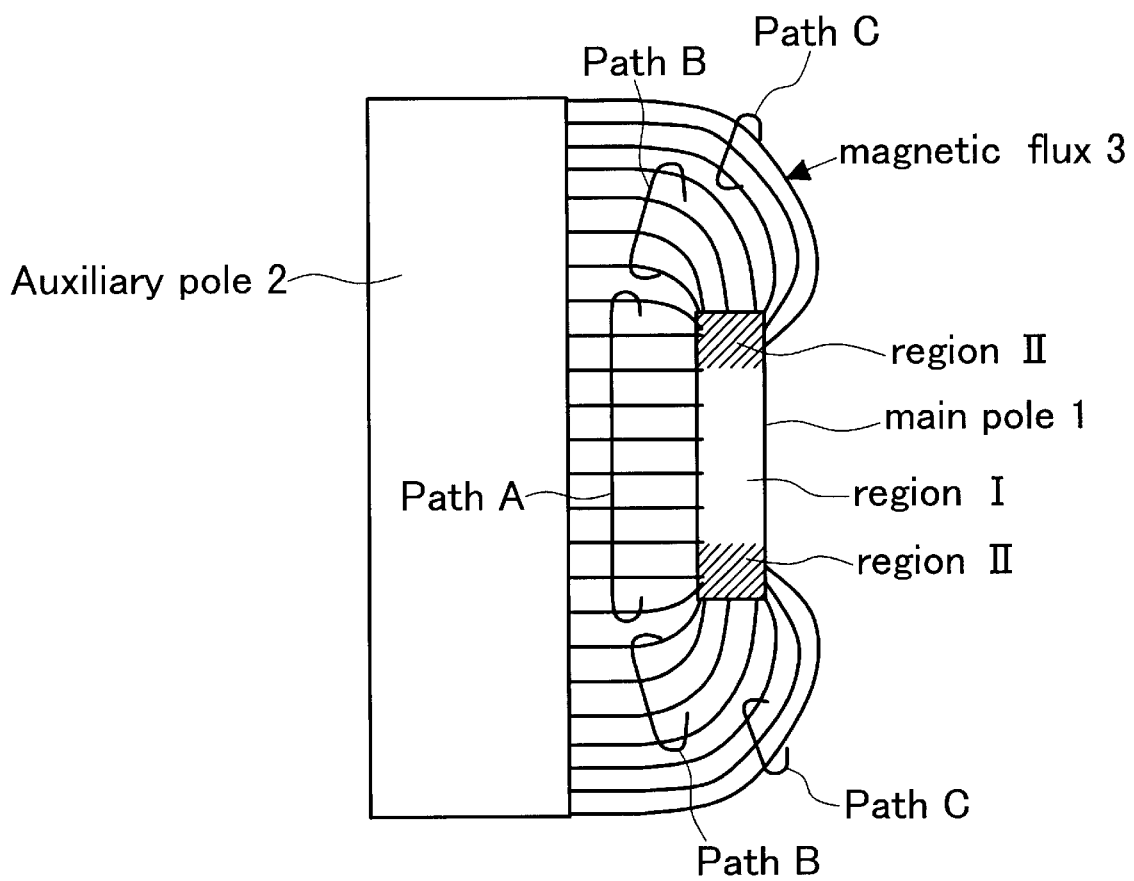
FIG. 1 is a diagram explaining the magnetic flux inside a soft magnetic underlayer.
Figure 2:
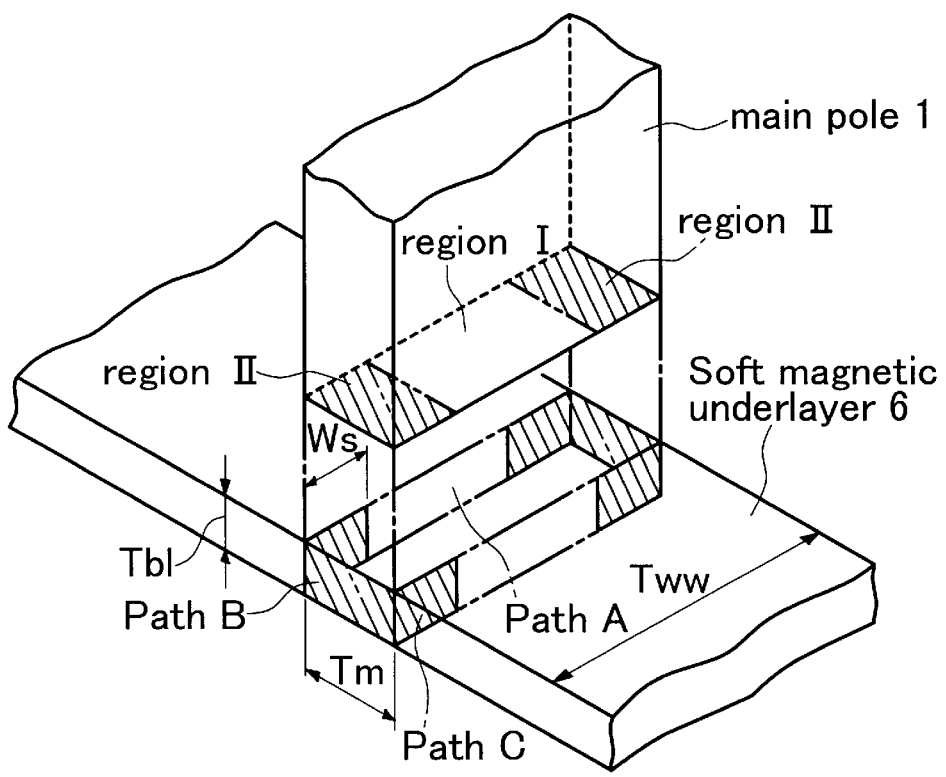
FIG. 2 is a diagram explaining paths through which magnetic flux flows.
Figure 3:
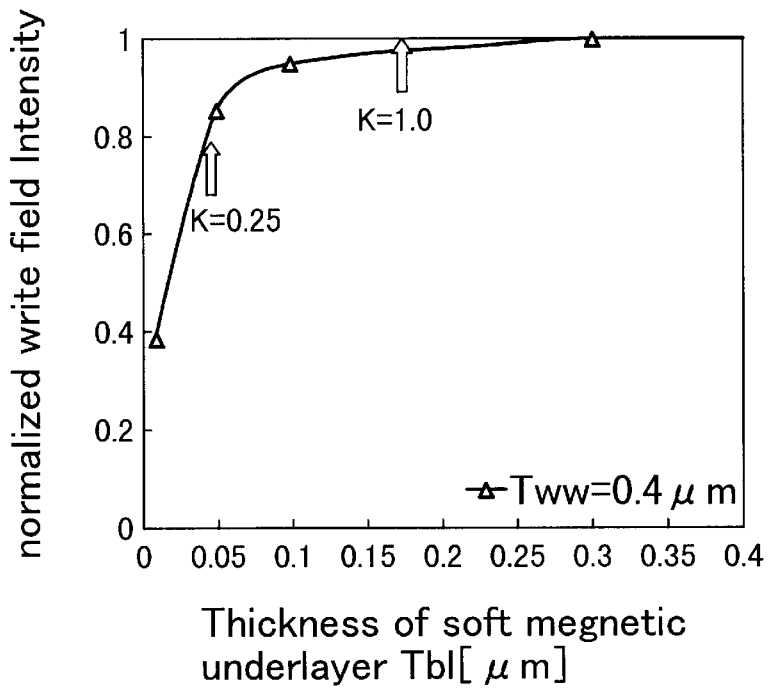
FIG. 3 is a chart showing the simulation results which corroborate the present invention.
Figure 4:
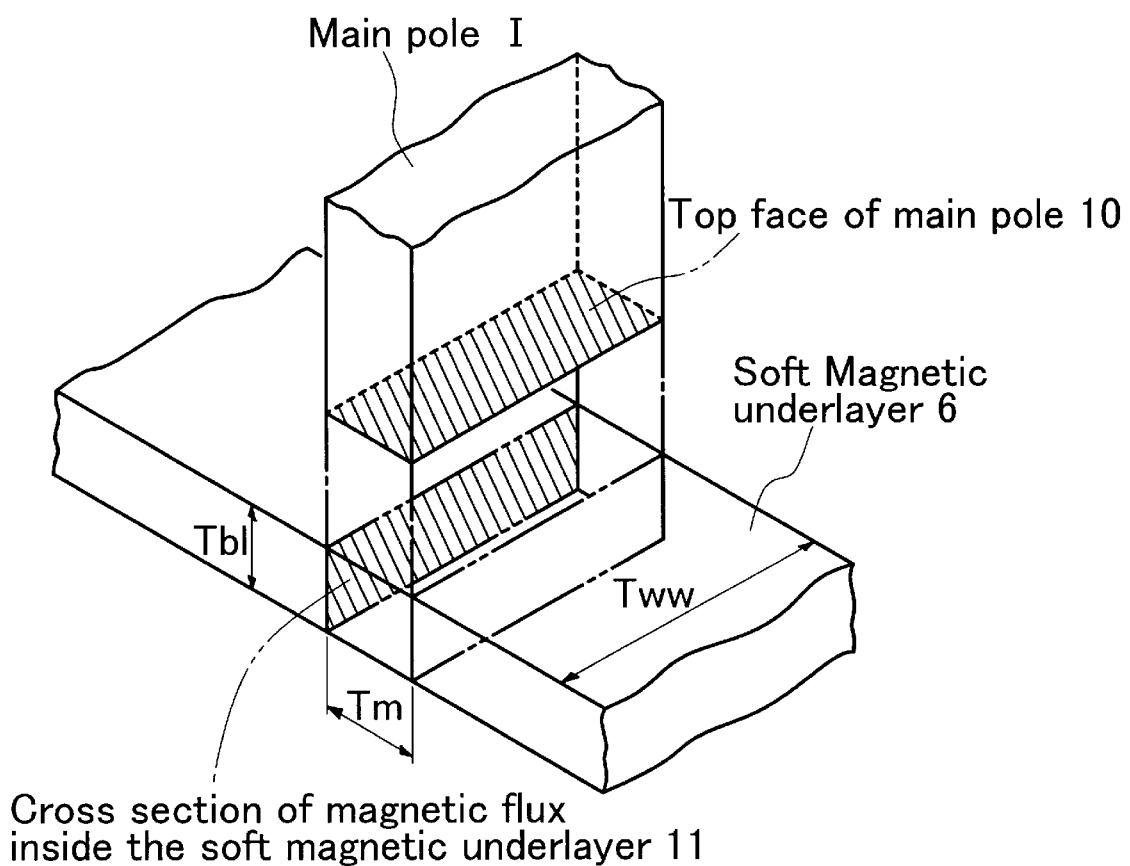
FIG. 4 is a diagram explaining the cross sections of the paths through which magnetic flux flows on a conventional model.
Figure 5:
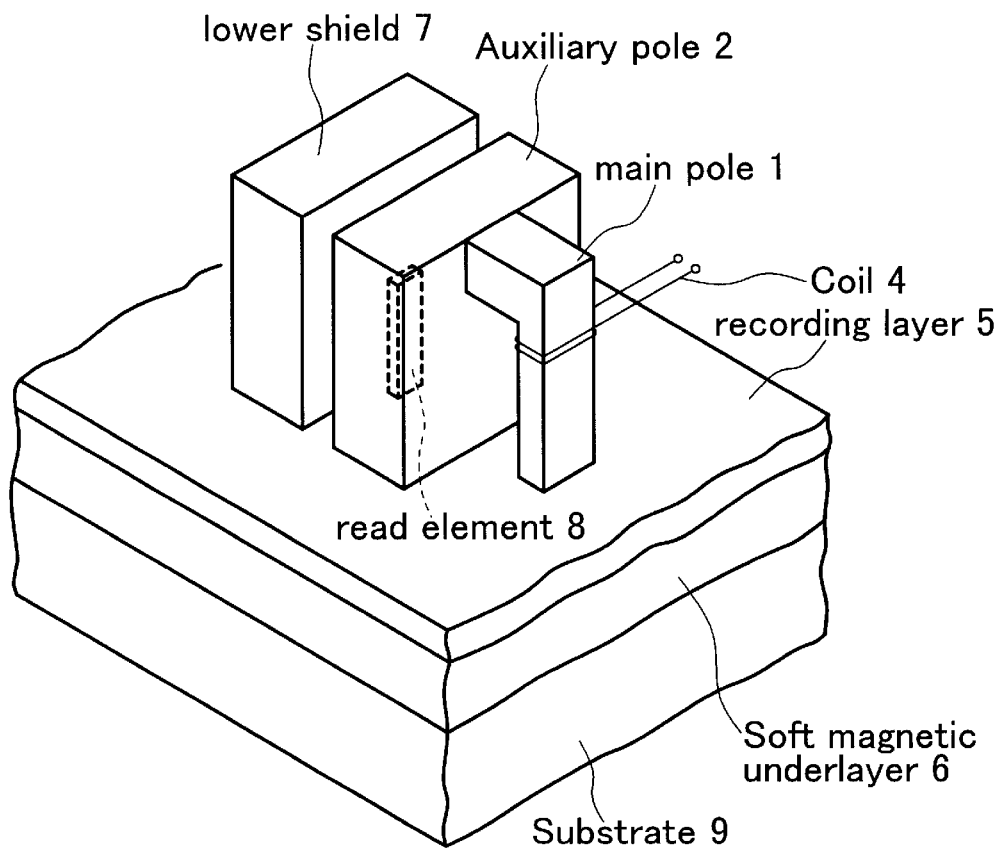
FIG. 5 is a diagram explaining the structures of a double layered perpendicular magnetic recording medium and a recording head.

FIG. 5 is an enlarged view of a magnetic head and magnetic recording medium in a perpendicular magnetic recording system according to the present invention. The magnetic recording medium is a double layered perpendicular magnetic recording medium having a soft magnetic underlayer 6 and a recording layer 5 on its substrate 9. A coil 4 is wound around a main pole 1 of a recording head. A write current flowing through the coil 4 induces write field. The recording head also has an auxiliary pole 2 magnetically coupled to the main pole 1, and is provided with a read element 8 between the auxiliary pole 2 and a lower shield 7 opposed thereto.

Figure 6:
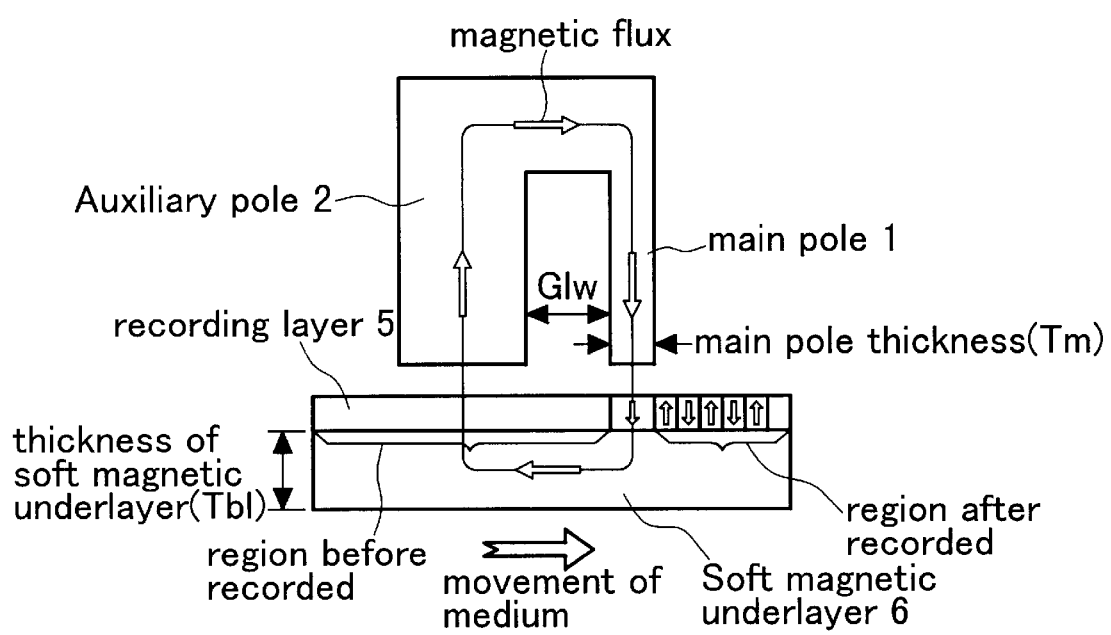
FIG. 6 is a diagram explaining the magnetic flux in the double layered perpendicular magnetic recording medium and the recording head.

FIG. 6 is a diagram explaining the magnetic flux in the double layered perpendicular magnetic recording medium and the recording head. As shown in FIG. 6, the magnetic recording medium moves in the direction of the arrow, magnetization transitions being recorded onto the recording layer 5 under the main pole 1. The region past the main pole 1 makes the region after recorded, and the portion ahead of the mail pole 1 is the region before recorded.

In the present embodiment, the main pole 1 has a track width $T_{WW}$ of 0.4 μm, a thickness $T_m$ of 0.5 μm, and a saturation flux density $B_{S1}$ of 1.6 T. The auxiliary pole 2 has a width of 20 μm, a thickness of 3 μm, and a saturation flux density $B_S$ of 1.0 T. The distance $G_{1w}$ between the main pole 1 and the auxiliary pole 2 is 5.0 μm. The magnetic recording medium uses a CoCrPt ternary type material of 25 nm in thickness for the recording layer 5, with a coercivity of approximately 3000 Oe. The soft magnetic underlayer 6 is made of CoNbZr, with a thickness $T_{b1}$ of 0.01 μm and a saturation flux density $B_{S2}$ of 1.2 T.

Figure 7:
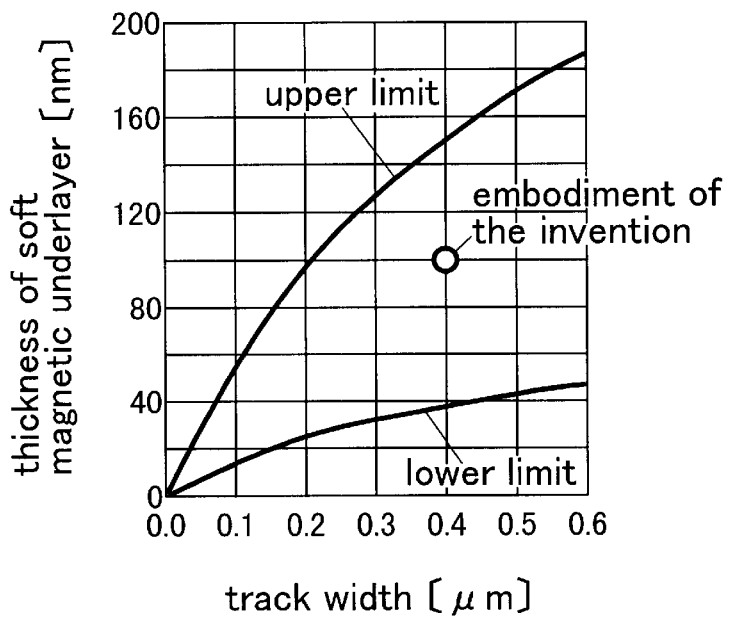
FIG. 7 is a chart showing the relation between a track width and the thickness of a soft magnetic underlayer in the present invention.

FIG. 7 shows the upper limit of the thickness of a soft magnetic underlayer with respect to a track width, corresponding to the expression (4), and the lower limit of the same corresponding to the expression (6), along with the position of the present embodiment. In the present embodiment, $$B_{S1} \times T_m \times T_{WW}/2(B_{S2} \times (T_m + T_{WW})) = 0.15\ [\mu m],$$

and thus the thickness $T_{b1}$ of the soft magnetic underlayer satisfies $$0.15 \times 0.25\ [\mu m] < T_{b1} = 0.1\ [\mu m] < 0.15\ [\mu m],$$

falling in between the upper and lower limits. Here, the intensity of write magnetic field under the auxiliary pole is approximately 6000 Oe. The intensity of write magnetic field reaches approximately twice the coercivity, thereby offering favorable overwrite characteristics.

Figure 8:
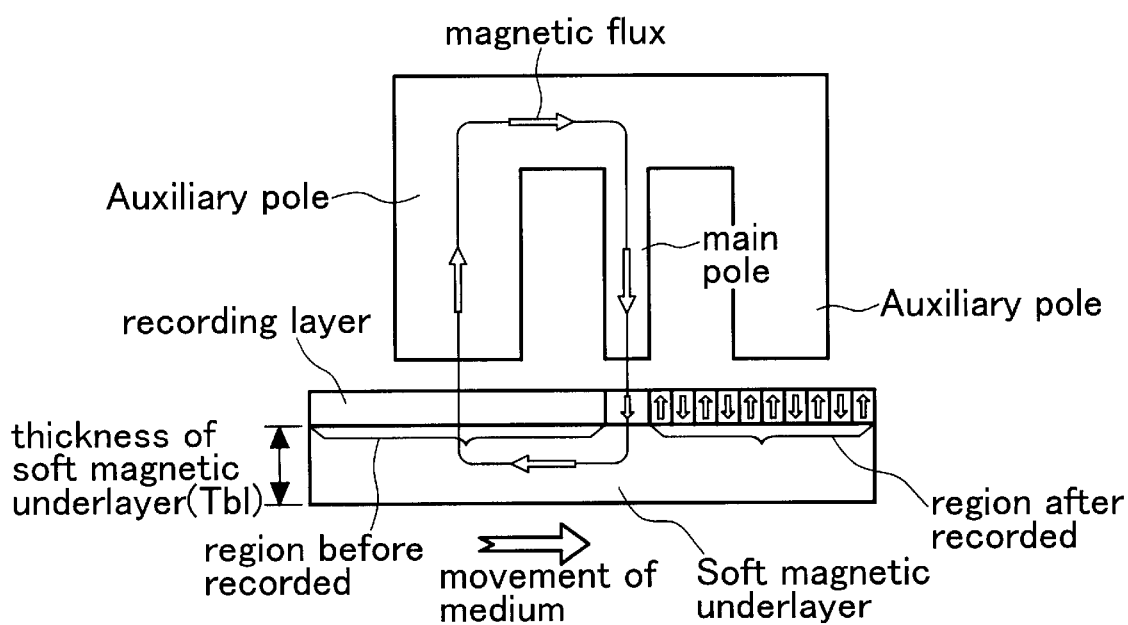
FIG. 8 is a diagram showing another example of the structure of the recording head to which the present invention is applicable.

The recording head described in the present embodiment has a two-pole structure consisting of a main pole and an auxiliary pole opposed thereto. Nevertheless, the present invention is applicable to any recording head pole structure which consists of a primary pole or primary poles for actual magnetic recording and a secondary pole or secondary poles with a flux-returning function but not for recording, including the pole structure consisting of three poles, a main pole between two auxiliary poles, as shown in FIG. 8.

Figure 9:
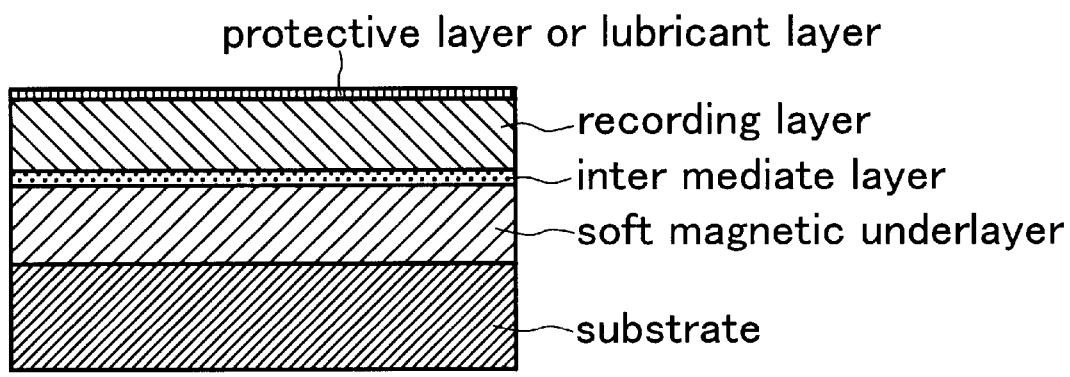
FIG. 9 is a schematic sectional view showing another structural example of the double layered perpendicular magnetic recording medium.
Figure 10:
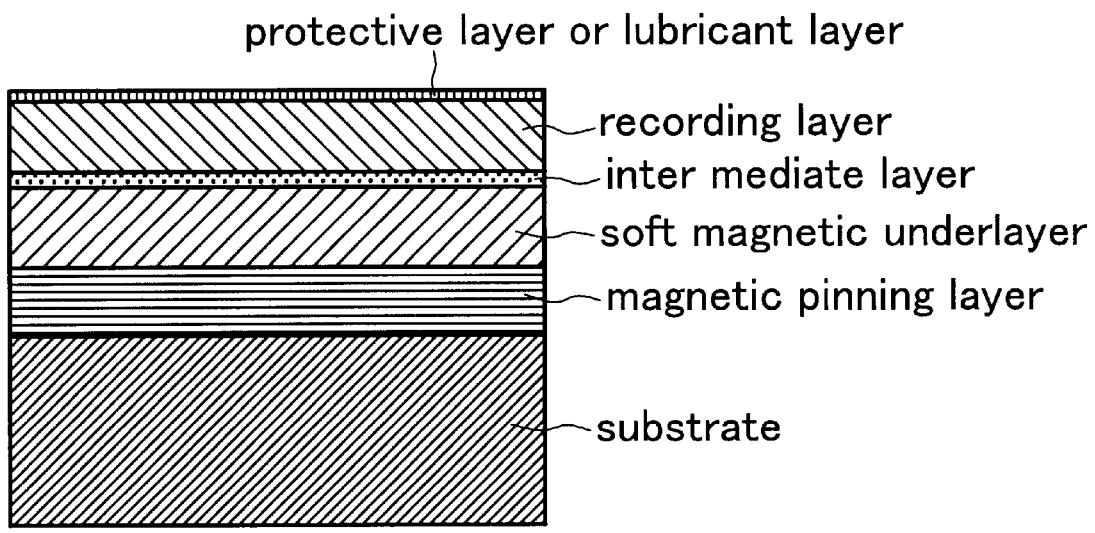
FIG. 10 is a schematic sectional view showing another structural example of the double layered perpendicular magnetic recording medium.

Besides, the double layered perpendicular magnetic recording medium described in the present embodiment has the recording layer arranged directly on the soft magnetic underlayer (soft magnetic layer). However, the present invention is applicable to a double layered perpendicular magnetic recording medium in which, as FIG. 9 schematically shows in cross section, a Ti or other intermediate layer for controlling the orientability of the recording layer is arranged on the soft magnetic underlayer. Moreover, the present invention is also applicable to a double layered perpendicular magnetic recording medium in which, as FIG. 10 schematically shows in cross section, an SmCo or other magnetic layer serving as a magnetic pinning layer for magnetic domain control is arranged under the soft magnetic underlayer. An NiAlP substrate, a glass substrate, and the like may be used as the substrate of the double layered perpendicular magnetic recording medium. Carbon or other material may be used for the protective layer. The soft magnetic underlayer may be formed of NiFe, FeAlSi, and the like, aside from the above-mentioned CoNbZr. The recording layer may be formed of CoCrTa, CoCrTaPt, FePt, and the like, aside from the above-mentioned CoCrPt.

According to the present invention, the track width of the recording head can be incorporated into the design of thickness of the soft magnetic underlayer to reduce the soft magnetic underlayer in thickness when the track width is small. This permits a reduction in the fabrication time and in the cost of a perpendicular magnetic recording system that uses a double layered perpendicular magnetic recording medium. In addition, the medium improves in surface roughness, thereby allowing a reduction of the head's flying height to facilitate the enhancement of recording density.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A perpendicular magnetic recording system comprising a perpendicular magnetic recording medium having a soft magnetic underlayer and a magnetic recording head for performing magnetic recording on said perpendicular magnetic recording medium, said magnetic recording head having a plurality of poles including a main pole for finally recording a magnetization reversal on said perpendicular magnetic recording medium, the perpendicular magnetic recording system satisfying $$T_{b1} < (B_{S1} \times T_m \times T_{WW})/2(B_{S2} \times (T_m + T_{WW})),$$

where $T_{b1}$ is the thickness of said soft magnetic underlayer in said perpendicular magnetic recording medium, $B_{S2}$ is the saturation flux density of the same, $T_m$ is the thickness of said main pole along a track direction in the vicinity of its floating surface, $T_{WW}$ is the track width of the same and is less than 0.5 μm., and $B_{S1}$ is the saturation flux density of the same.

2. The perpendicular magnetic recording system according to claim 1, wherein the thickness $T_{B1}$ of said soft magnetic underlayer satisfies $$T_{b1} > 0.25(B_{S1} \times T_m \times T_{WW})/2(B_{S2} \times (T_m T + T_{WW})).$$

3. The perpendicular magnetic recording system according to claim 1, wherein the distance between said main pole and another pole of said magnetic recording head is greater than or equal to 0.5 μm.

4. The perpendicular magnetic recording system according to claim 2, wherein the distance between said main pole and another pole of said magnetic recording head is greater than or equal to 0.5 μm.

5. The perpendicular magnetic recording system according to claim 3, wherein the thickness $T_{b1}$ of said soft magnetic underlayer in said perpendicular magnetic recording medium is smaller than or equal to 0.2 μm.

6. The perpendicular magnetic recording system according to claim 4, wherein the thickness $T_{b1}$ of said soft magnetic underlayer in said perpendicular magnetic recording medium is smaller than or equal to 0.2 μm.

* * * * *